(12) United States Patent
Kerr et al.

(10) Patent No.: US 8,257,187 B2
(45) Date of Patent: Sep. 4, 2012

(54) CONSTANT VELOCITY JOINTS

(75) Inventors: Michael Kerr, Newbury (GB); Adrian Paul Moore, Cold Ash (GB)

(73) Assignee: Xtrac Limited (GB)

( * ) Notice: Subject to any disclaimer, the term of this patent is extended or adjusted under 35 U.S.C. 154(b) by 309 days.

(21) Appl. No.: 12/525,390

(22) PCT Filed: Feb. 13, 2008

(86) PCT No.: PCT/GB2008/000485
§ 371 (c)(1),
(2), (4) Date: Jul. 31, 2009

(87) PCT Pub. No.: WO2008/102106
PCT Pub. Date: Aug. 28, 2008

(65) Prior Publication Data
US 2010/0075764 A1    Mar. 25, 2010

(30) Foreign Application Priority Data

Feb. 23, 2007  (GB) .................................. 0703585.0
Aug. 16, 2007  (GB) .................................. 0715946.0

(51) Int. Cl.
*F16D 3/22* (2006.01)
(52) U.S. Cl. ........................................ 464/144; 464/906
(58) Field of Classification Search .................. 464/140, 464/144–146, 149, 157, 182, 906; 403/335, 403/337, 364
See application file for complete search history.

(56) References Cited

U.S. PATENT DOCUMENTS
2,200,641 A * 5/1940 Ricefield ........................ 464/149
(Continued)

FOREIGN PATENT DOCUMENTS
FR    857977    11/1940
(Continued)

OTHER PUBLICATIONS

"Defintion of spline." Merriam-Webster Online. May 22, 2006, [online], [retrieved on Aug. 18, 2011] Retrieved from the Internet <URL: http://web.archive.org/web/20060522194700/http://merriam-webster.com/dictionary/spline>.*

(Continued)

*Primary Examiner* — Gregory Binda
*Assistant Examiner* — Josh Skroupa
(74) *Attorney, Agent, or Firm* — Fay Sharpe LLP

(57) ABSTRACT

A constant velocity (CV) joint assembly comprising a CV joint and an input member is disclosed. The CV joint that has a cage and a gear between which rotational drive can be transmitted. The input member is connected to the cage of the CV joint for transmission of rotational drive about an axis from an external component to the CV joint. The rotational drive is transmitted between the cage and the input member through interacting drive faces that are disposed in a plane that is generally parallel to the axis. The cage and the input member are retained in interconnection by fastening means that are not responsible for transmission of rotational drive between the cage and the input member. By separating the task of transmission of torque and retention of the connection between the cage and the input member, the fastening means required to perform the latter task can be comparatively light. An increase in torque capacity of the CV joint assembly does not lead to a corresponding increase in the strength requirement of such fastening means. The orientation of the drive faces ensures that there is minimal axial force between the cage and the input member.

12 Claims, 4 Drawing Sheets

U.S. PATENT DOCUMENTS

| | | | |
|---|---|---|---|
| 4,253,776 A | 3/1981 | Orain | |
| 6,146,022 A | 11/2000 | Sahashi et al. | |
| 2002/0187843 A1 | 12/2002 | Krude | |
| 2005/0170899 A1* | 8/2005 | Dine et al. | 464/145 |

FOREIGN PATENT DOCUMENTS

| | | | | |
|---|---|---|---|---|
| JP | 06-042545 | * | 2/1994 | 464/145 |
| WO | WO 2006/097194 | | 9/2006 | |

OTHER PUBLICATIONS

"Theory." West Michigan Spline. Apr. 21, 2001, [online], [retrieved on Aug. 8, 2011] Retrieved from the Internet <URL: http://web.archive.org/web/20010421064644/http://westmichiganspline.com/technical8.htm>.*

International Search Report for PCT/GB2008/000485, Jun. 4, 2008.

* cited by examiner

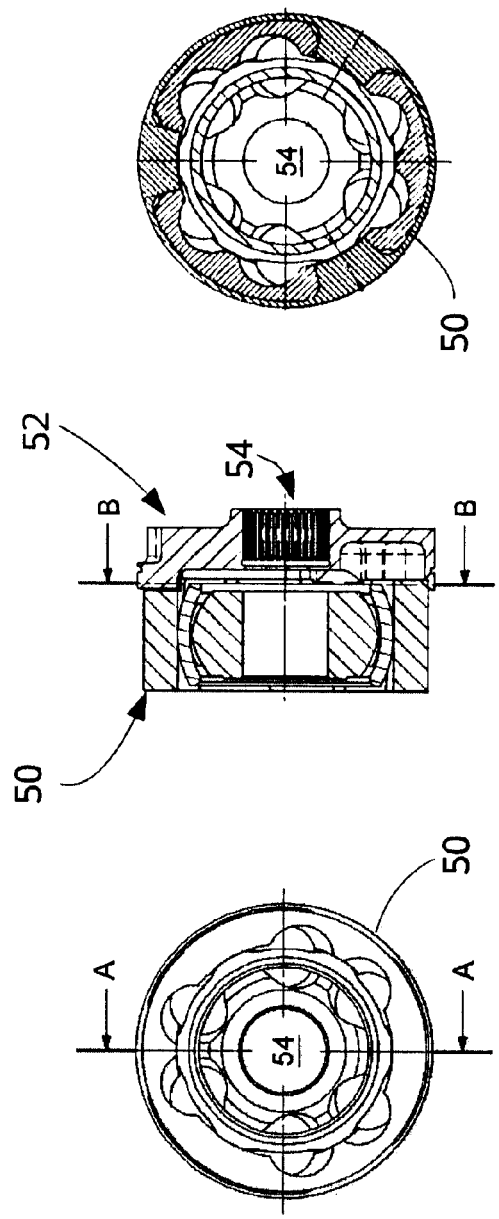
Fig 3
Fig 4
Fig 5
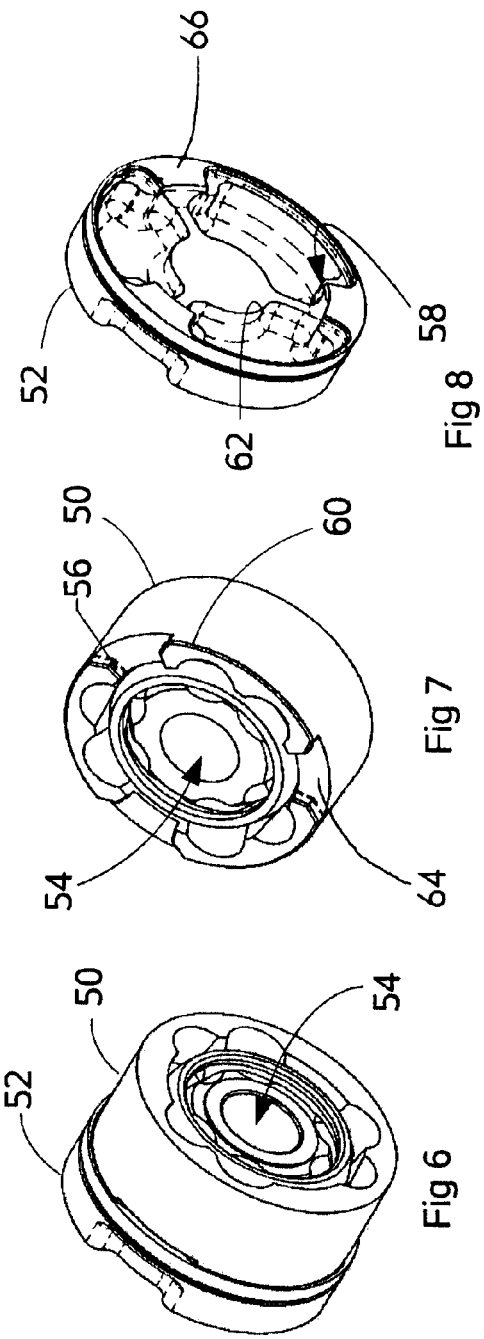
Fig 6
Fig 7
Fig 8

CONSTANT VELOCITY JOINTS

FIELD OF INVENTION

This invention relates to universal joints and to arrangements for connecting such a joint to a drive shaft. Embodiments of the invention have particular, but not exclusive, application connection of a constant velocity (CV) joint to the output of a transmission unit.

BACKGROUND

The conventional arrangement for retention of a CV joint on the output of a transmission unit typically includes a plain bolted and dowelled face joint connection between a flat face of the joint and an output flange of the transmission unit. The bolts serve two purposes: to retain the components interconnected, and to transmit torque from one component to the other. This conventional fixation arrangement has several disadvantages when high performance (typically high torque), light weight, or compact installation of a constant velocity joint is required. High torque applications typically dictate bolts and dowels that are capable of transmission of a large torque as shear forces. This contributes significantly to the physical size and mass of the complete joint system.

SUMMARY

An aim of the invention is to provide an arrangement for establishing a connection between rotating devices such as an output of a transmission unit and a universal joint that is more compact and/or contains less mass than conventional arrangements.

The arrangement provided by the invention allows the torque transmission and retention requirements of such a joint system to be affected by two separate features.

From a first aspect the invention provides a CV joint assembly comprising a CV joint that has a cage and a gear between which rotational drive can be transmitted, and an input member connected to the cage of the CV joint for transmission of rotational drive about an axis from an external component to the CV joint, the cage and the input member each including a respective drive member having a mating face that extends in a plane substantially normal to the axis, at least one of the drive members having a plurality of dogs that extend in the axial direction from the mating face and engage corresponding recesses in the mating face of the other drive member, said dogs and recesses having interacting drive faces that are each disposed in a respective plane that is substantially parallel to the axis; wherein the rotational drive is transmitted between the cage and the input member through the interacting drive faces and the cage and the input member are retained in interconnection by fastening means that secure the cage to the input member but are not responsible for transmission of rotational drive between the cage and the input member.

By separating the task of transmission of torque and retention of the connection between the cage and the input member, the fastening means required to perform the latter task can be comparatively light. An increase in torque capacity of the CV joint assembly does not lead to a corresponding increase in the strength requirement of such fastening means. The orientation of the drive faces ensures that there is minimal axial force between the cage and the input member.

The fastening means may comprise one or more threaded fasteners that extend axially. For example, the fastening means may include one or more bolts that pass through the input member into tapped holes in the cage. In such embodiments, the bolts may pass through oversized holes in the input member to ensure that there is no lateral contact between the bolts and the input member that could transmit torque. Alternatively, any other suitable fastening means may be used. For example, the fastening means may comprise a circlip or a threaded nut.

Embodiments of the invention may include a variety of CV joint configurations. For example, the CV joint may be an Rzeppa joint, a tripod joint, a Löbro joint or a Thompson coupling.

In one configuration, the input member may be a boss that can be engaged with a shaft. For example, the boss may have a splined axial aperture. Alternatively, the input member may be a connection shaft that can engage with an external component. For example, the connection shaft may have a splined tail 14 that can engage within a component within a transmission unit.

Advantageously, the drive members have a total of between two and six dogs, preferably three or four dogs

BRIEF DESCRIPTION OF DRAWINGS

Embodiments of the invention will now be described in detail, by way of example, and with reference to the accompanying drawings, in which:

FIG. 3 is an end view of a CV joint assembly being a second embodiment of the invention;

FIG. 4 is a section on A-A of FIG. 3;

FIG. 5 is a section on B-B of FIG. 4;

FIG. 6 is a perspective view of the joint assembly of FIG. 3;

FIG. 7 is a perspective view of a CV joint being part of the assembly of FIG. 3;

FIG. 8 is a perspective view of a drive flange being part of the assembly of FIG. 3;

DETAILED DESCRIPTION

Figure 1:
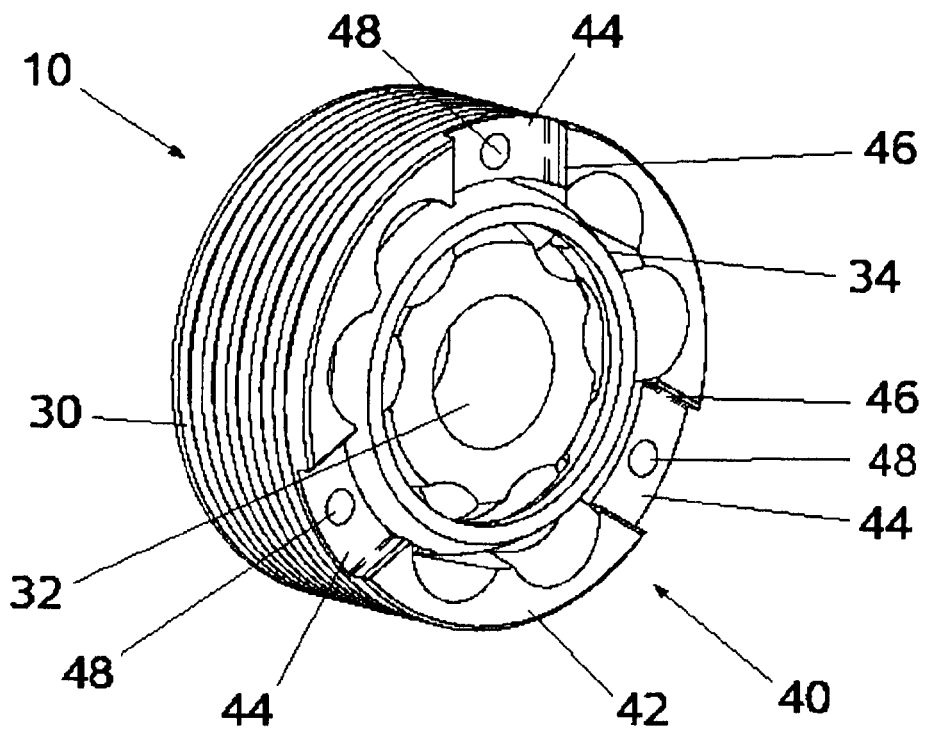
FIG. 1 is a perspective view of a constant velocity (CV) joint being a first embodiment of the invention.
Figure 2:
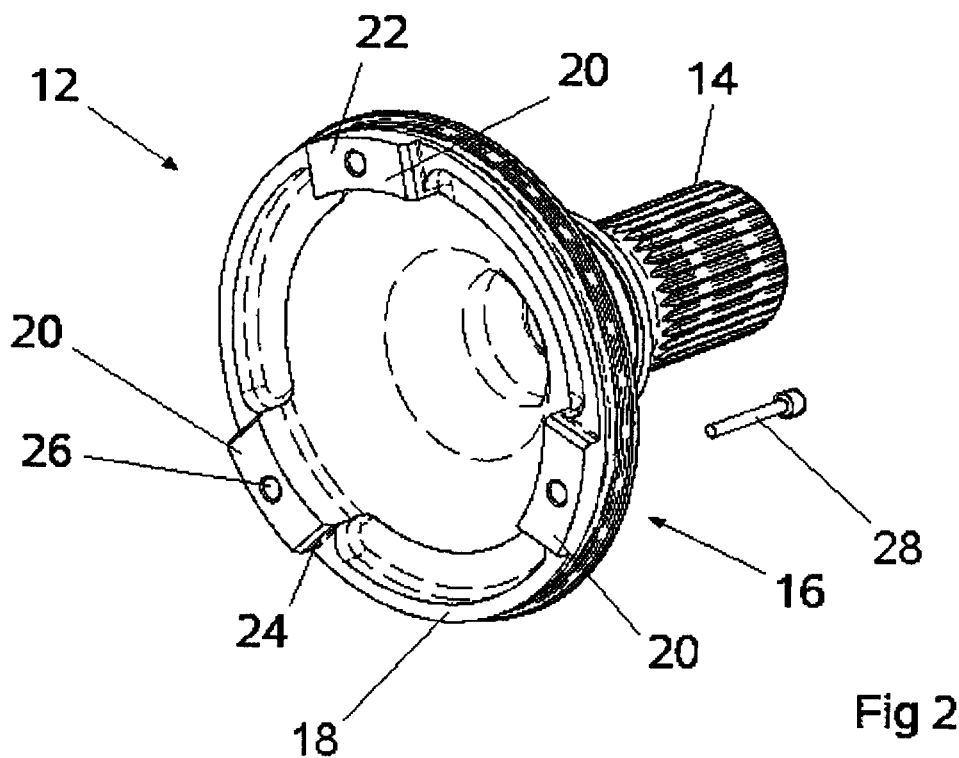
FIG. 2 is a perspective view of a connection shaft for use with the CV joint of FIG. 1.

With reference to FIGS. 1 and 2 of the drawings, an embodiment of the invention as implemented as an inner constant velocity (CV) joint assembly for a front-wheel drive, rear-wheel drive or all-wheel drive vehicle will now be described.

The purpose of the CV joint 10 is to transmit torque between an output from a transmission unit (typically a final drive unit) and a drive shaft that is connected, for example, to CV joint carried on a road wheel hub. The CV joint is required because the angle of the shaft with respect to the output will change as the suspension on which the hub is carried moves under changing load.

Output from the transmission unit is transmitted to the CV joint by an input member comprising a connection shaft 12, which is rotationally symmetrical about a rotational axis. The connection shaft 12 has a splined tail 14 that engages within a component within the transmission unit. The connection shaft 12 has a drive flange 16 formed integrally with the tail. The drive flange 16 has an outer diameter that is greater than that of the tail 14, and is carried on a bell-shaped section that extends from an axial end portion of the tail.

The drive flange 16 has a mating face 18 that extends in a plane normal to the rotational axis. The mating face 18 carries three circumferentially-spaced drive dogs 20 that extend axially from the mating face. Each dog 20 has an end face 22 and two drive faces 24, each lying in a respective plane that extends parallel to, but is offset from, the rotational axis. A respective bolt hole 26 for a fastening means comprising for example a threaded fastener or bolt 28 is formed through each dog 20 in a direction parallel to the rotational axis.

The CV joint 10 comprises a cage 30 within which is a star gear 32, a race 34 and drive balls (not shown). The cage 30 is rotationally symmetrical about a rotational axis. The operation of the joint is conventional, and will therefore not be discussed further as it will be entirely familiar to those in the technical field. The, connection of the CV star gear 32 to a splined drive shaft is also conventional.

The cage 30 has a drive flange 40 for connection to the connection shaft 12. The drive flange 40 has a mating surface 42 that extends in a plane normal to the rotational axis in a peripheral part of an axial end face of the cage 30. There are three recesses 44 formed in the mating surface. Each recess 44 extends axially into the mating surface 42 and is terminated in a pair of drive faces 46, each of which lies in a respective plane that extends substantially parallel to, but is offset from, the rotational axis. A tapped hole 48 is formed within each recess, extending parallel to the axis of rotation.

The respective shapes and dimensions of the dogs 20 and the recesses 44 are such that, when the mating surfaces 18, 42 of the cage 30 and the connection shaft 12 are brought into contact, each dog 20 is a close fit within a respective recess 44, with their respective drive surfaces 24,46 in close contact with one another. In this condition, each bolt hole 26 aligns with a respective tapped hole 48, such that a bolt 28 can be passed through each bolt hole 26 and retained within the tapped hole 48, thereby securing the connection shaft 12 to the cage 30.

With the joint assembled as described in the last-preceding paragraph, torque is transmitted between the connection shaft 12 and the cage 30 by interaction between the drive surfaces 24,46. The orientation of the drive surfaces is such that torque transmission is achieved by direct application of force from one drive surface to the adjacent drive surface, the force being directed along a line that is normal to the drive surfaces and therefore tangential with respect to the rotational axis. The bolts 28 do not contribute significantly to the transmission of torque, so need only be of strength sufficient to maintain interconnection between the connection shaft 12 and the cage 30. The bolts can, therefore, be comparatively lightweight components. The bolt holes 26 are preferably larger than the diameter of the bolts 28 to ensure that torque load is not transferred to them since this might cause the bolts to fail.

A second embodiment of the invention is shown in FIGS. 3 to 8. The second embodiment is applied to a six-ball Löbrotype constant velocity joint. This embodiment comprises a CV joint 50 and a drive boss 52 that serves as an input member. Any suitable fastening means (not shown) may be used for fastening the CV joint 50 and the drive boss 52 in the axial direction. For example, the fastening means may comprise one or more of a threaded bolt, a circlip or a threaded nut.

The drive boss 52 is generally disc-shaped with an outer diameter substantially the same as that of the CV joint. It has an axial through-bore 54 that is internally splined.

Internally and in its manner of operation the CV joint is conventional, so it will not be described further.

As with the first embodiment, the CV joint 50 and the drive boss 52 carry drive surfaces 56, 58 that fit closely with one another and can interengage to transmit torque between the CV joint 50 and the drive boss 52. In the embodiment of FIGS. 3 to 8, the drive surfaces 56, 58 are carried on three axially-projecting dogs 60 and three recesses 62 formed on the cage and the drive boss 52 respectively, the dogs being simply shaped as segments of an annulus. The dogs 60 extend axially from a mating face 64 of the CV joint 50 and the recesses 62 are formed in a corresponding mating face 66 of the drive boss 52. The mating faces 64,66 extend in a plane substantially normal to the rotational axis.

Figure 9:
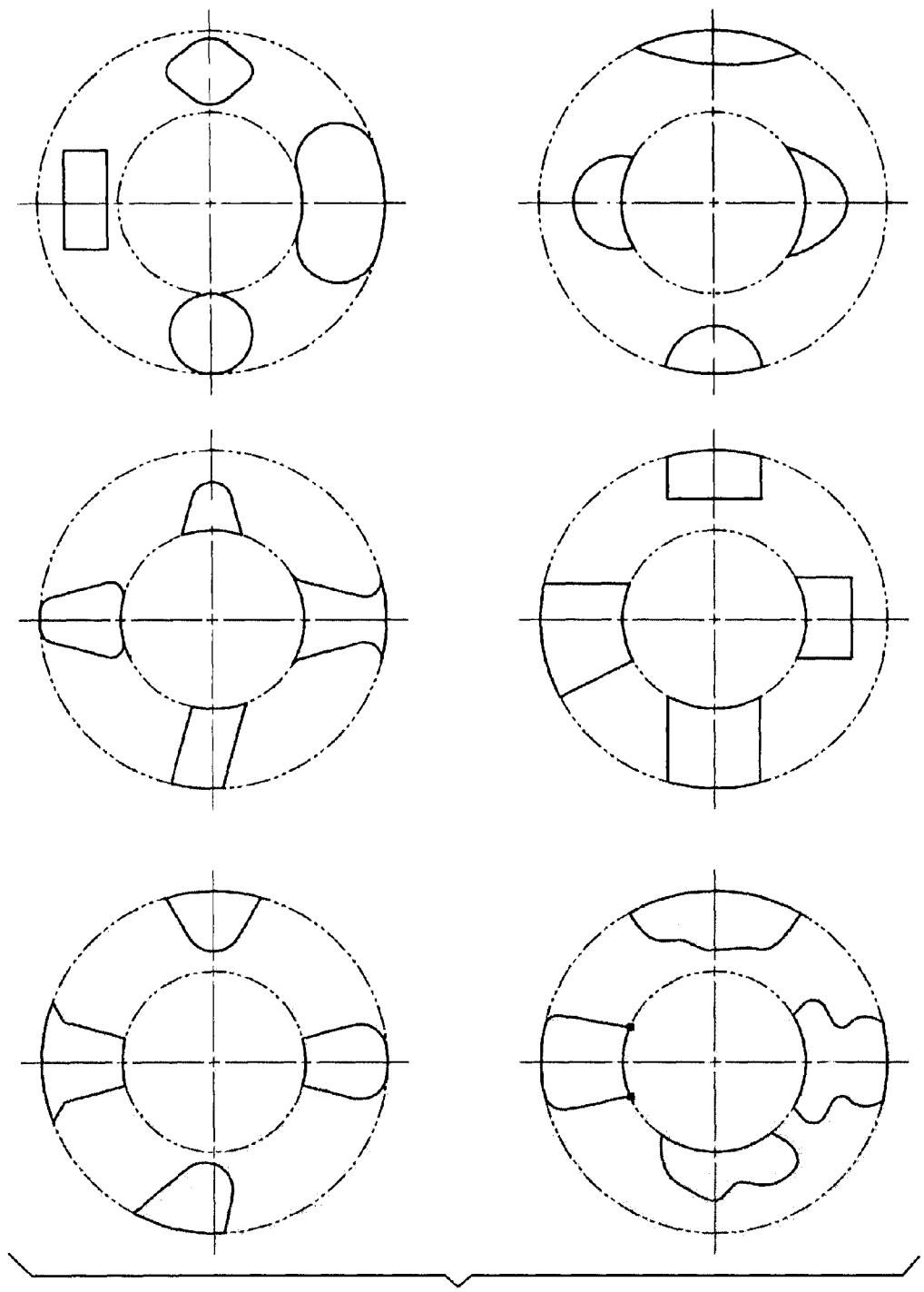
FIG. 9 illustrates twenty-four different shapes of drive dogs that can be used in embodiments of the invention.

The drive dogs, when viewed in axial section, can be substantially any shape, with the limitation that each dog has at least one drive surface lying in plane that is substantially parallel to the axis of rotation. Moreover, there is no requirement that all of the dogs be similarly shaped. Indeed, there may be applications where it is advantageous for at least one dog to have a different shape to the others to ensure that the CV joint and the drive boss 52 can be interconnected only at one position of mutual rotation. FIG. 9 shows twenty-four possible drive dog shapes; these are examples only and are not exhaustive. The illustrations in FIG. 9 represent the shape of the dogs when viewed in a direction that is parallel to the axis of rotation.

The number of drive dogs 60, 62 can vary from one embodiment to another. The above examples have three dogs, but more may be provided to handle greater torque, and two may be sufficient in some applications. Preferably, the CV joint has from two to six dogs, more preferably three or four dogs.

Figure 10:
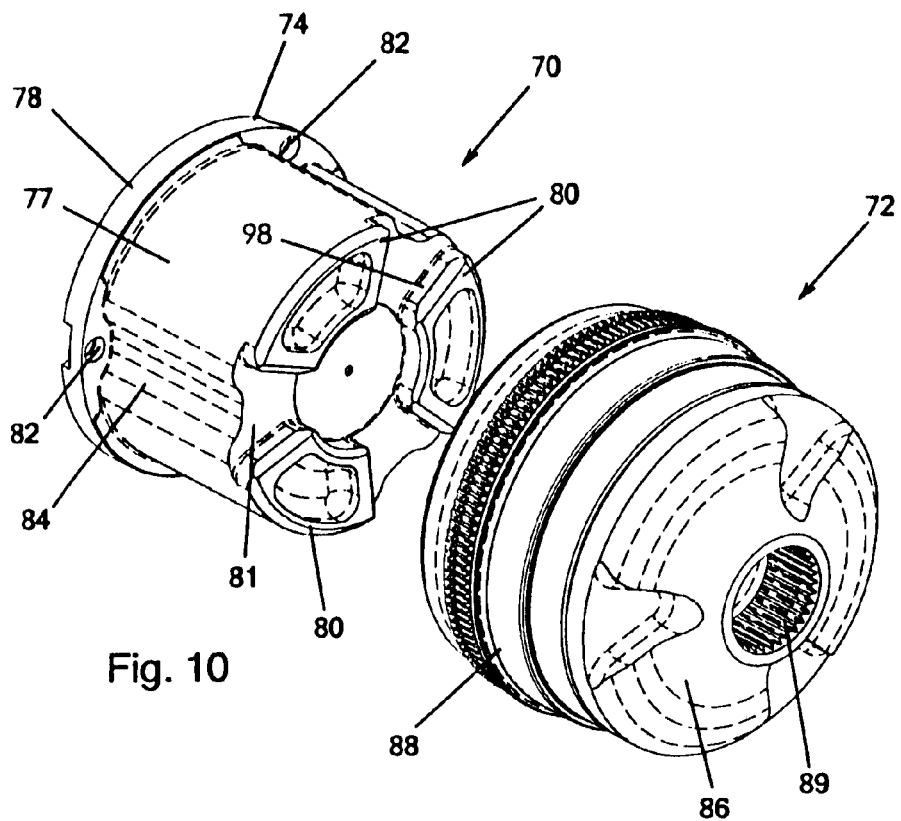
FIGS. 10 and 11 are isometric views illustrating a third embodiment of the invention.
Figure 11:
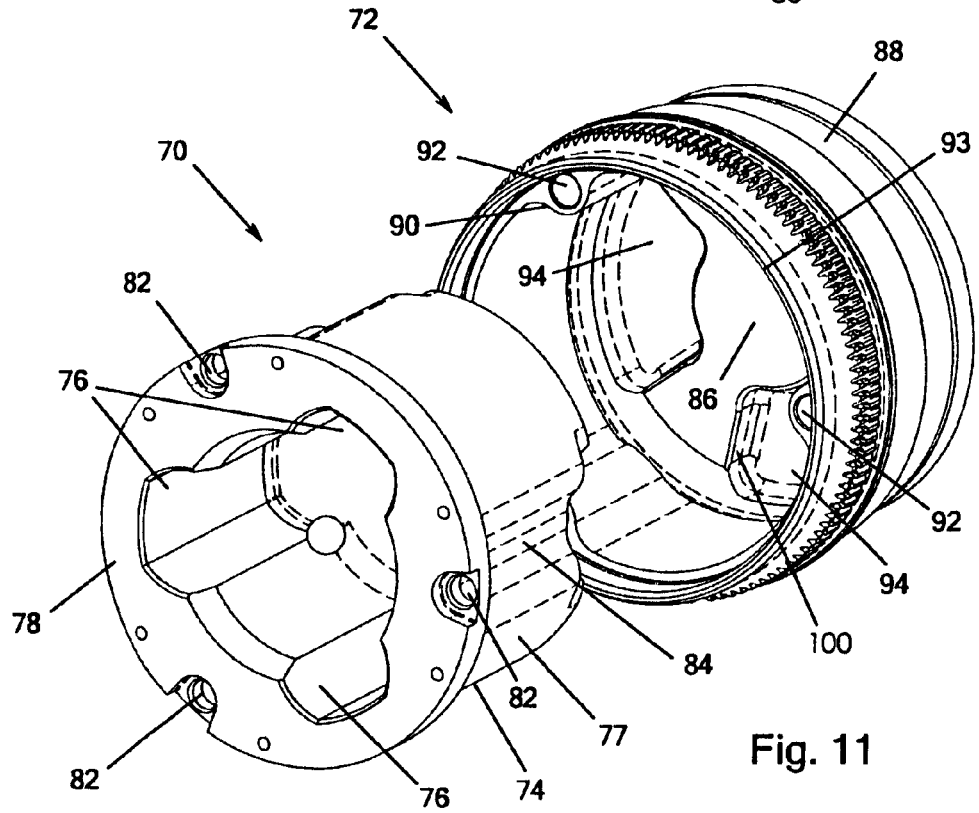

A third embodiment of the invention for use within a rear differential unit is shown in FIGS. 10 and 11. This embodiment comprises a CV joint 70 and an input member 72. Only the external drive cage 74 of the CV joint 70 is shown. This includes three internal channels 76 that in use accommodate the star gear and the drive balls (not shown) of the CV joint mechanism. The internal mechanism and the manner of operation of the CV joint are conventional, so will not be described further. Externally, the drive cage 74 has a substantially cylindrical outer wall 77, having an outwardly-extending flange 78 at one end. At the opposite end, the drive cage 74 has a mating face 81 and three drive dogs 80 that extend axially from the mating face 81.

Three bolt holes 82 are provided in the flange 78. When the CV joint is assembled, these bolt holes 82 receive fastening bolts (not shown) that extend through the flange 78 in the axial direction. Three recesses 84 are provided in the cylindrical outer wall 77 of the cage, each recess being aligned with one of the bolt holes 82.

The input member 72 is in the form of a cup having a circular end wall 86 and a substantially cylindrical circumferential wall 88. An internally splined axial through-bore 89 is provided in the end wall 86 for connection to a drive shaft (not shown). On the internal surface of the circumferential wall 88 three inwardly-extending ribs 90 are formed, each of which has a tapped hole 92 for receiving one of the fastening bolts. The internal diameter of the cylindrical wall 88 is larger than the external diameter of the drive cage 74, which can therefore be accommodated within the input member 72 in a recessed fashion, the ribs 90 being received within the recesses 84. A rim 93 that extends axially from the free end of the circumferential wall 88 has an interference fit with the edge of the flange 78 to help support the cage 74 within the input member 72.

Three drive recesses 94 are provided on an inner mating face 96 of the end wall 86 for receiving the dogs 80 on the mating face 81 of the cage 74. The dogs 80 and the recesses 94 have corresponding drive faces 98,100, each of which is disposed in a plane that is substantially parallel to the rotational axis. In use, rotational drive is transmitted between the input member 72 and the cage 74 solely through the interaction of the dogs 80 with the drive recesses 94 through the drive faces 98,100. The cage 74 is fastened to the input member 72 by fastening bolts (not shown) that pass through the bolt holes 82 and are screwed into the tapped holes 92 in the input member 72. These bolts only carry an axial load to prevent separation of the cage 74 from the input member 72: they do not transmit any torque, which is transmitted solely by the drive dogs 80 and the drive recesses 94.

The invention claimed is:

1. A CV joint assembly comprising:
   a CV joint comprising a cage and a gear between which rotational drive can be transmitted, and
   an input member connected to the cage of the CV joint for transmission of rotational drive about an axis from an external component to the CV joint,
   the cage and the input member each including a respective drive member comprising a mating face that extends in a plane substantially normal to the axis,
   at least one of the drive members comprising between two and six dogs that extend in the axial direction from the mating face and the other drive member comprising a corresponding number of recesses that extend axially into the mating face of the other drive member, said recesses being engaged by the dogs,
   said dogs and recesses comprising interacting drive faces that are each disposed in a respective plane that is substantially parallel to the axis;
   wherein the rotational drive is transmitted between the cage and the input member through the interacting drive faces and the cage and the input member are retained in interconnection by fastening means that secure the cage to the input member but are not responsible for transmission of rotational drive between the cage and the input member.

2. A CV joint assembly according to claim 1 in which the fastening means comprises one or more threaded fasteners that extend axially.

3. A CV joint assembly according to claim 2 in which the fastening means includes one or more bolts that pass through the input member into tapped holes in the cage.

4. A CV joint assembly according to claim 3 in which the bolts pass through oversized holes in the input member to ensure that there is no lateral contact between the bolts and the input member that could transmit torque.

5. A CV joint assembly according to claim 1 in which the CV joint is one of a Rzeppa joint, a tripod joint, a Lobro joint or a Thompson coupling.

6. A CV joint assembly according to claim 1 in which the input member comprises a boss adapted to be engaged with a shaft.

7. A CV joint assembly according to claim 6 in which the boss comprises a splined axial aperture.

8. A CV joint assembly according to claim 1 in which the input member includes a connection shaft adapted to engage an external component.

9. A CV joint assembly according to claim 8 in which the connection shaft comprises a splined tail that can engage within a component within a transmission unit.

10. A CV joint assembly according to claim 1, in which the drive members have a total of three or four dogs.

11. A CV joint assembly comprising:
    a cage including a first drive face;
    an input member including a second drive face;
    said first and second drive faces extending in respective planes that are substantially normal to an axis of rotation of the input member, at least one of the first and second drive faces including between two and six dogs that extend in an axial direction and the other of said first and second drive faces including a corresponding number of recesses that extend axially into said other drive face, said recesses being respectively engaged with said dogs, each engaged dog and recess pair comprising at least one drive surface interface for transmitting torque between said input member and said cage;
    fastening means for axially securing the first and second drive members together with said dogs and recesses engaged, wherein at least substantially all torque transmitted between said input member and said cage is transmitted through said engaged dogs and recesses independent of said fastening means.

12. The CV joint assembly as set forth in claim 11 in which said drive surface interfaces are each disposed in a respective plane that is substantially parallel to the axis of rotation.

* * * * *